(12) United States Patent
Huber (10) Patent No.: US 10,611,395 B2
(45) Date of Patent: Apr. 7, 2020

(54) MOTOR-ADJUSTABLE STEERING COLUMN FOR A MOTOR VEHICLE

(71) Applicants: THYSSENKRUPP PRESTA AG, Eschen (LI); thyssenkrupp AG, Essen (DE)

(72) Inventor: Sebastian Huber, Göfis (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 103 days.

(21) Appl. No.: 16/077,642

(22) PCT Filed: Feb. 7, 2017

(86) PCT No.: PCT/EP2017/052576
§ 371 (c)(1),
(2) Date: Aug. 13, 2018

(87) PCT Pub. No.: WO2017/140526
PCT Pub. Date: Aug. 24, 2017

(65) Prior Publication Data
US 2019/0031224 A1    Jan. 31, 2019

(30) Foreign Application Priority Data
Feb. 18, 2016    (DE) .......................... 10 2016 202 465

(51) Int. Cl.
*B62D 1/181* (2006.01)
*B62D 1/183* (2006.01)
(Continued)

(52) U.S. Cl.
CPC ............. *B62D 1/181* (2013.01); *B62D 1/183* (2013.01); *B62D 1/184* (2013.01); *B62D 1/185* (2013.01)

(58) Field of Classification Search
None
See application file for complete search history.

(56) References Cited

U.S. PATENT DOCUMENTS

2010/0242665 A1\* 9/2010 Nagamura ............. B62D 1/185
74/493
2014/0305252 A1   10/2014 Mizuno
(Continued)

FOREIGN PATENT DOCUMENTS

DE    102012222295 A    6/2013
JP       2006224867 A    8/2006
(Continued)

OTHER PUBLICATIONS

English Translation of International Search Report issued in PCT/EP2017/052576, dated May 2, 2017 (dated May 12, 2017).

*Primary Examiner* — Drew J Brown
(74) *Attorney, Agent, or Firm* — thyssenkrupp North America, Inc.

(57) ABSTRACT

A motor-adjustable steering column including a supporting unit which is connectable to a vehicle body and by which an actuating unit is held which includes a steering spindle mounted in a casing unit to be rotatable about a longitudinal axis. The casing unit has an outer casing tube, in which an inner casing tube is accommodated to be axially displaceable telescopically in the direction of the longitudinal axis. An actuating drive is connected to the inner casing tube and the outer casing tube by which the inner casing tube may be displaced axially in and out relative to the outer casing tube. A feature arranged between the outer casing tube and the inner casing tube generates a frictional force between outer casing tube and inner casing tube with regard to relative displacement which is adjustable between a release position and at least one friction position.

15 Claims, 4 Drawing Sheets

(51) Int. Cl.
*B62D 1/184* (2006.01)
*B62D 1/185* (2006.01)

(56) References Cited

U.S. PATENT DOCUMENTS

| | | | |
|---|---|---|---|
| 2018/0050718 A1* | 2/2018 | Galehr | B62D 1/184 |
| 2018/0086362 A1* | 3/2018 | Sakayanagi | B62D 1/185 |
| 2018/0141581 A1* | 5/2018 | Kato | F16H 1/203 |
| 2018/0251147 A1* | 9/2018 | Heitz | B62D 1/181 |
| 2019/0283793 A1* | 9/2019 | Matsuno | B62D 1/185 |

FOREIGN PATENT DOCUMENTS

| | | |
|---|---|---|
| JP | 2007090977 A | 4/2007 |
| WO | 2014125174 A | 8/2014 |

* cited by examiner

MOTOR-ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2017/052576, filed Feb. 7, 2017, which claims priority to German Patent Application No. DE 10 2016 202 465.5, filed Feb. 18, 2016, the entire contents of both of which are incorporated herein by reference.

FIELD

The present disclosure generally relates to a motor-adjustable steering column for a motor vehicle.

BACKGROUND

Steering columns for motor vehicles comprise a steering shaft with a steering spindle, to whose rear end in the direction of travel, facing the driver, a steering wheel is attached for the introduction of a steering command by the driver. The steering spindle is rotatably mounted in an actuating unit, which is connected with the vehicle body via a supporting unit which for example comprises bracket parts for connection with the vehicle body, which bracket parts hold the actuating unit. Adjustment on the one hand allows setting of a comfortable, ergonomic steering wheel position relative to the driver's position in the operating position, also known as the driving or use position, in which manual steering intervention may occur. The adjustment range of possible driving or use positions is designated the "comfort position range". On the other hand, the steering wheel may, if no manual steering intervention by the driver is needed, such as for example during autonomous driving, be moved into a stowage position outside of possible use positions of the operating position, so as to be able to put the internal vehicle space freed up thereby to an alternative use. To this end, the steering column is stowed outside the comfort position range by retracting the inner casing tube (also designated the inner tubular casing or inner casing) to the maximum extent in the longitudinal direction, i.e. forwards in the direction of travel in the direction of the longitudinal axis into the outer casing tube (also designated the outer tubular casing, outer casing unit or guide box), so maximizing the distance between the steering wheel and the driver's position. As a rule, the steering wheel of an adjustable steering column is also height-adjustable, the actuating unit being mounted on the supporting unit so as to be vertically pivotable about a pivot pin extending transversely of the longitudinal axis. By pivoting the actuating unit into the highest possible position, it may be brought into the vertical stowage position.

It is known in the prior art to provide a motorized actuating drive to adjust the actuating unit relative to the supporting unit, which actuating drive comprises an electric motor, for example, which is coupled via a gear unit to the actuating unit and enables electrical control of the steering wheel position.

In the case of a steering column of the type in question, a motorized linear actuating drive is inserted between the inner and outer casing tubes for longitudinal adjustment. The casing tubes may be moved translationally relative to one another in the direction of the longitudinal axis by the actuating drive, such that the inner casing tube may be retracted or extended telescopically relative to the outer casing tube. The actuating drive may for example take the form of a spindle drive comprising a spindle nut screwed onto a threaded spindle, which may be driven in rotation relative to the spindle by an electric motor.

One advantage of motor-adjustable steering columns is that, to increase driving and user comfort, steering wheel positions can be set in motorized manner within the comfort position range and also individual steering wheel positions can be stored electronically and be automatically retrieved and set when required. Moreover, the steering column may be retracted automatically into the stowage position outside the comfort position range.

It is in principle conceivable and possible both to adjust a motor-adjustable steering column with a sufficiently long adjustment path in the direction of the longitudinal axis in the longitudinal direction within the comfort position range and to retract the inner casing tube beyond the comfort position range maximally into the outer casing tube as far as into the stowage position. In this case, it must be ensured that, in every possible use position in the operating position, the actuating unit has the highest possible rigidity, which may be achieved by the minimum possible play between the casing tubes. At the same time, it is necessary to ensure that the actuating unit can be moved as quickly as possible into and in particular out of the stowage position, to which end the frictional force during relative displacement of the casing tubes must be as low as possible, so that the actuating drive does not have to be dimensioned to be overly powerful. Reducing the frictional force to the necessary extent for this purpose by increasing play between the casing tubes would however reduce the rigidity of the actuating unit and the natural frequency of the steering column, which is not acceptable. Due to these conflicting objectives, known motor-adjustable steering columns are not suitable for automatic stowage of a steering column.

To achieve the described conflicting objectives, WO2014/125174 A1 describes a stowable steering column which comprises separate actuating drives for adjustment in the longitudinal and vertical directions, and a third actuating drive which has an additional telescopic adjusting mechanism for stowage in the longitudinal direction. However, this known structure is complex, technically demanding and heavy.

Thus a need exists for a motor-adjustable steering column for a motor vehicle having a simpler structure at the same time as high rigidity and a high speed of adjustment into or out of the stowage position.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a motor-adjustable steering column for a motor vehicle, comprising a supporting unit which is connectable with a vehicle body and by which an actuating unit is held which comprises a steering spindle mounted in a casing unit so as to be rotatable about a longitudinal axis, the casing unit having an outer casing tube, in which an inner casing tube is accommodated so as to be axially displaceable telescopically in the direction of the longitudinal axis, and having an actuating drive, which is connected with the inner casing tube and the outer casing tube and by which the inner casing tube may be displaced axially in and out relative to the outer casing tube.

It is proposed according to the invention that a friction means is arranged between the outer casing tube and the inner casing tube, by which friction means a frictional force may be applied between outer casing tube and inner casing tube with regard to relative displacement and which is adjustable between a release position and at least one friction position, wherein the frictional force is higher in the friction position than in the release position and wherein the frictional force is lower in the release position and in the friction position than an axial adjusting force which can be exerted by the actuating drive between the outer casing tube and the inner casing tube.

According to the invention, the frictional force between the casing tubes, which corresponds to the frictional or adjusting resistance and which counteracts an axial adjusting force of the actuating device for relative axial adjustment, may be predetermined as a function of the adjustment range by means of the friction means in the event of relative adjustment in the longitudinal direction. For adjustment within the comfort position range, the friction means is switched into the friction position. In this case, the frictional force is predetermined for example in such a way by reducing the play between the outside of the inner casing tube and the inside of the outer casing tube and/or increasing the contact pressures acting between the inner and outer casing tubes and determining the frictional force that the actuating unit has sufficient rigidity. This may be achieved for example in that the inner casing tube is gripped or clamped in the outer casing tube, so as to form a rigid connection. The relatively high frictional force in this case enables the actuating drive to effect relatively slow lengthwise adjustment to set the steering wheel position within the comfort setting range. For this positioning option known per se from motor-adjustable steering columns, a conventionally dimensioned electrical servomotor may be used as actuating drive.

The friction means may preferably also be designated a clamping device. The friction device preferably acting as a clamping device clamps the inner casing tube in the outer casing tube in the friction position.

The outer casing tube may preferably be accommodated in a further additional casing tube, preferably displaceably relative to the additional casing tube, and/or a further additional casing tube may be accommodated in the inner casing tube, preferably displaceably relative to the inner casing tube. Alternatively or in addition, provision may be made for a further additional casing tube to be provided between the inner casing tube and the outer casing tube, which further additional casing tube is displaceable relative to the inner casing tube and/or relative to the outer casing tube. With these variant embodiments a multi-telescopic casing unit may be provided, with a plurality of casing tubes nested within one another. In this way, a casing unit may be provided which ensures a long adjustment path and at the same time has a small structural space requirement when the casing tubes have been telescoped into one another.

If the steering column is to be moved with the highest possible adjustment speed out of the stowage position into the use position or out of the use position into the stowage position, the friction means is switched into the release position. This is distinguished in that the frictional force between inner and outer casing tube is lower than in the friction position, for example by increasing the play and/or the contact pressures acting between the outside of the inner casing tube and the inside of the outer casing tube. In this way, the frictional force is reduced to such an extent that, without increasing the power available from the actuating drive, i.e. the driving force in the longitudinal direction, more rapid acceleration and a higher relative adjustment speed of the casing tubes may be achieved than in the friction position. In other words, the proportion of the power which the actuating drive saves for adjustment due to the reduced friction in the release position is used to increase adjustment speed. This may for example be achieved in that the inner casing tube is gripped or clamped less firmly or strongly in the outer casing tube or the grip is completely released. In this way, the inner casing tube may be moved more smoothly in the longitudinal direction in the outer casing tube than in the friction position. The associated temporary reduction in the rigidity of the actuating unit or of the steering column in the release position is acceptable since the steering column is not operated outside the comfort position range, i.e. no manual steering torque is input.

Preferably, the difference between the value of the actuating drive power to be applied for adjustment in the release position and the value of the actuating drive power to be applied for adjustment in the friction position is less than ±20%, preferably less than ±10% and particularly preferably ±5%.

The above-stated conflicting objectives are achieved according to the invention in that within the comfort position range the friction means is brought into a friction position which is distinguished by a relatively high frictional force and high rigidity, and outside the comfort position range is switched over into a friction position which is distinguished by a relatively low frictional force and lower rigidity than in the friction position. In this way, it is possible, even when the axial adjusting force exertable by the actuating drive between the outer casing tube and the inner casing tube is substantially identical in the release position and in the friction position, for relatively slow adjustment to proceed within the comfort position range for setting the optimal steering wheel position, and for a high adjustment speed to be achieved during adjustment from the stowage position into the comfort position range and during stowage outside the comfort position range into the stowage position. In this case, an actuating drive known per se for adjusting the length of a steering column may advantageously be used. In this case, there is no need either for a larger servomotor size or for a complex control system, or for a complex gear unit or for a complex structure such as in the prior art. The structure according to the invention is simpler, lighter and cheaper to put into practice.

One essential feature of the invention is that the main function of the friction means is not to fix the casing tubes frictionally together but rather to provide at least two different levels of frictional force, both of which allow adjustment of the steering column in the longitudinal direction by means of the actuating drive. The levels may be activated by switching over between the friction and release positions, wherein either easier adjustability or higher rigidity is established.

A steering column according to the invention may result in a method according to the invention which is characterized in that, on adjustment of the actuating unit by means of an actuating drive, during adjustment into a steering column operating position within a comfort setting range, a friction means is moved into the friction position, and during stowing of the steering column into the stowage position the friction means is moved into a release position outside the comfort setting range, wherein in the friction position the frictional force and the rigidity of the connection between the outer casing tube and the inner casing tube are greater than in the release position.

In this way, adjustment may be undertaken as required in any possible steering wheel control position to adapt the steering wheel position to the driver's position, wherein sufficient steering column rigidity is ensured for a steering intervention. By switching the friction means over into the release position outside the comfort position range, easy, low-friction adjustment may proceed at a high adjustment speed for changing from or into the stowage position.

The friction means may be attached to the outer casing tube. For example, it may be comprise a gripping or clamping device firmly connected with the outer casing tube and preferably arranged on the outside thereof, which device may be brought into frictional contact with the inner casing tube. The gripping or clamping device may optionally be switched into the friction position or release position, wherein in the friction position the inner casing tube is mounted in the outer casing tube so as to be displaceable in the longitudinal direction with a higher frictional force than in the release position, whereby a more rigid connection between inner and outer casing tube is produced than in the release position. In the release position the gripping or clamping device is released, by increasing the play between the surfaces gripped together or clamped against one another or by reducing the contact pressure between these surfaces. In this way, the frictional force is reduced between the casing tubes and adjustability is thereby simplified and rigidity reduced in comparison with the friction position.

It is alternatively also conceivable and possible for the friction means to comprise a gripping or clamping device attached to the supporting unit. This may likewise interact with the casing tubes to increase or reduce the frictional force and rigidity as required.

One advantageous configuration of the invention provides that the friction means comprises a pressure device and at least one friction element with a friction surface, wherein, in the friction position, the pressure device presses the friction surface with a predetermined contact pressure against a sliding surface on the inner casing tube. The pressure device is preferably connected firmly with the outer casing tube, and the friction element is connected with the pressure device, preferably fixedly in the direction of the longitudinal axis. In this way, the frictional force between the friction surface and a sliding surface formed on the inner casing tube determines the frictional force between the casing tubes with regard to a relative movement in the longitudinal direction. In this respect, the frictional force is greater, the greater is the amount of contact pressure (normal force) acting on the friction surface. The friction means may accordingly be moved into a friction position, a predetermined contact pressure being exerted, whereby a predetermined frictional force is predefined between friction surface and thus between outer and inner casing tubes. At the same time, the friction element clamped by the pressure device against the inner casing tube ensures gripping or clamping of the inner casing tube, wherein an increase in the contact pressure makes the connection between inner and outer casing tubes more rigid. Gripping or clamping should not be understood to mean that no relative motion can take place between the inner casing tube and the outer casing tube. To switch over into the release position, the acting contact pressure may be reduced or eliminated, whereby the friction surface is released from the inner casing tube or at least the play between friction surface and sliding surface is increased, or the frictional force dependent on the contact pressure is at least reduced. In this way, it is in any event ensured that the inner casing tube, driven by the actuating drive, may be displaced more readily in the outer casing tube in the direction of the longitudinal axis.

The friction element may be firmly connected to the pressure device, for example by fastening elements, connecting elements or indeed by a one-piece configuration. Provision may likewise be made for a spring element to be arranged between the pressure device and the friction element. The spring element spring-loads the friction surface resiliently against the sliding surface. In this way, the profile of the contact pressure with which the friction surface is pressed against the sliding surface on the inner casing tube may be predefined as a function of the distance between the friction element and the sliding surface of the inner casing tube. In this way, it is for example also possible for the friction surface to be resiliently in contact with the sliding surface in the release position. In the friction position the increased contact pressure is transferred via the spring element to the friction element and thus to the friction surface. The spring element may preferably take the form of a helical or cup spring.

In one advantageous embodiment, the friction element comprises a plastics material, i.e. it is either made wholly of plastics or comprises a plastics part, or is wholly or at least in part provided with a plastics coating. The plastics material is preferably arranged in the region of the friction surface. This results in uniform frictional or sliding behavior on the inner casing tube and seizing and a change in frictional characteristics caused by corrosion or the like may be effectively prevented. In this respect, the use of a plastics material with good surface slip properties, such as for example PTFE, ensures low-wear long-term operation.

It is furthermore advantageous for the friction element to be arranged in a hole delimited in the longitudinal direction in the outer casing tube. In this case, the friction element is guided through an orifice in the outer casing tube, such that its friction surface may be loaded from outside with the contact pressure against the outer face of the inner casing tube guided coaxially in the outer casing tube. Because the opening is delimited in the longitudinal direction, on adjustment of the inner casing tube in the longitudinal direction the friction element rests form-fittingly against the outer casing tube, whereby the frictional force exerted in the process is absorbed.

It is advantageous for the pressure device to have a force-generating element, which rests against the outer casing tube or against the supporting unit. The force-generating element, also designated pressure element, preferably rests against the outer casing tube and in the friction position exerts the contact pressure on the friction element towards the sliding surface on the inner casing tube, whereby the friction surface is loaded relative to the outer casing tube with the contact pressure against the sliding surface on the inner casing tube. The force-generating element may be configured passively as a resilient element, for example as a spring, which presses the friction element within the comfort position range the friction surface without energy being supplied externally against the inner casing tube, or alternatively as an active actuator, for example as an electromagnetic actuator, which is electrically switchable to enable or disable the friction position.

It is advantageous for the pressure device to comprise an operating element which may be activated to set the release position, wherein the friction surface is released from the sliding surface on the inner casing tube or at least the contact pressure is reduced relative to the friction position. By operating the operating element, the pressure device may be switched over between the friction position and the release position. Operation may proceed on leaving and reaching the comfort position range, resulting in automatic switchover into and out of the release position. The operating element may comprise a mechanism which, on operation, exerts on the friction element a releasing force in the opposite direction from the contact pressure, which releasing force ensures that the friction surface is relieved or released by the inner casing tube, or the play between friction surface and inner casing tube is increased. This reduces the frictional force.

By pivoting the actuating unit about the pivot pin, the operating element may be brought into active engagement with the supporting unit to enable the release position.

Provision may be made for the pressure device to comprise a lever mounted pivotably on the outer casing tube, which lever comprises the operating element and a friction element. The lever may be mounted pivotably externally on the outer casing tube and comprise a pivot pin which preferably extends transversely of the longitudinal axis. The pivot pin may for example be mounted rotatably in a bearing block which is fastened on the outer casing tube. The lever preferably takes the form of a double lever, wherein the operating element is arranged on the one lever arm or the lever arm forms the operating element. To operate the operating element, a force is exerted from outside on this lever arm, such that the lever is pivoted relative to the outer casing tube. On the other lever arm the friction element may be attached, which is raised radially in an outward direction from the inner casing tube or at least relieved when a force directed radially from outside towards the inner casing tube is exerted on the operating element. The force ratio between the operating force transferred by the operating element to the friction element may be predefined by the length ratio of the lever arms.

In one advantageous embodiment, the actuating unit is mounted on the supporting unit so as to be vertically pivotable about a pivot pin extending transversely of the longitudinal axis. Pivoting about such a horizontal pivot pin may result in height adjustment, with which the steering wheel attached to the rear end of the steering spindle may be adjusted heightwise relative to the driver's position.

The above-stated height adjustment may proceed manually. It is advantageous, in particular for automated stowage of the steering column during or for autonomous driving, for an electrical vertical actuating drive to be connected with the supporting unit and the actuating unit by which the actuating unit may be moved relative to the supporting unit about the pivot pin. The vertical actuating drive is likewise known per se and may for example take the form of an electromotively driven spindle drive, as described above for the longitudinal adjustment.

One advantageous embodiment of the invention provides that the operating element may, by pivoting the actuating unit about the pivot pin, be brought into active engagement with the supporting unit to set the release position, i.e. to switch over into or out of the release position. In this case, the operating element is arranged on the outer casing tube such that it strikes against the supporting unit in a particular height position of the height adjustment and is thereby operated. The above-stated height position forms a switchover position, which is located outside the use range of the steering column and which is passed on stowage in the vertical direction prior to reaching or on reaching the vertical stowage position, which is conventionally located in the upper range of the maximum vertical adjusting height. In this case, the friction means is switched over from the friction into the release position, such that the casing tubes may be retracted by the then reduced frictional force with a high adjustment acceleration and adjustment speed in the longitudinal direction from the comfort position range into the stowage position. If the actuating unit is in the stowage position, the operating element lying against the supporting unit is activated, i.e. operated, to enable the release position. In this way, the casing tubes may be extended by the actuating drive with high actuating acceleration and speed as far as into the comfort position range.

One advantage of the above-stated embodiment is that switchover of the friction means proceeds automatically by a movement sequence predefined during stowage, such that no additional activation or control measures are needed. In this way, a method may be obtained with little effort which provides that the friction means is brought into the release position on reaching a switching position by pivoting the actuating unit about the pivot pin towards the stowage position. Conversely, the friction means—specifically once the inner casing tube has been extended at high speed—is brought into the friction position on entry into the comfort position range by pivoting the actuating unit about the pivot pin towards the operating position. In this case, operation of the operating element is deactivated and the friction position thereby enabled automatically.

On stowage, the following steps are performed:
movement of the actuating unit in the vertical direction towards the stowage position, until a switching position is reached, wherein switchover into the release position proceeds,
retraction of the inner casing tube in the longitudinal direction into the outer casing tube, until the stowage position is reached in the longitudinal direction.

Provision may additionally be made for the actuating unit to be adjusted in the vertical direction after retraction of the inner casing tube until the switching position is reached, wherein switchover into the friction position proceeds. High rigidity in the stowage position may then be achieved thereby.

Accordingly, on leaving the stowage position the steps performed for stowage are run through in reverse order to set the use position:
extension of the inner casing tube in the longitudinal direction out of the outer casing tube, until the comfort position range is reached in the longitudinal direction,
movement of the actuating unit in the vertical direction out of the stowage position, until a switching position is reached, wherein switchover into the friction position proceeds.

In this way, the actuating unit may be moved quickly initially in the longitudinal direction out of the stowage position and then be set to the optimal user height by the vertical actuating drive.

It is furthermore advantageous for an energy-absorbing means to be arranged between the supporting unit and the actuating unit or the outer casing tube and the inner casing tube. Such an energy-absorbing means, also known as a crash means, constitutes an effective measure for improving occupant safety in the event of a vehicle collision, namely in the event of a crash or head-on vehicle collision, in which the driver impacts the steering wheel at high speed. To ensure controlled braking of a body impacting the steering wheel, it is possible to couple an energy-absorbing means in between the supporting unit and the actuating unit, or between the outer casing tube and the inner casing tube, which in normal operation are fixed relative to one another but which in the event of a crash are pushed together in the direction of the longitudinal axis. This converts the kinetic energy introduced into plastic deformation of an energy-absorbing element, for example by tearing a tear lug or bending an elongate bending element, for instance a bending wire or bending strip, or by widening an elongate hole by means of a pin or by stretching a sheet metal strip or by detaching a chip by means of a plane.

In the various figures identical parts are always provided with the same reference signs and are therefore as a rule also respectively only named or mentioned once.

Figure 1:
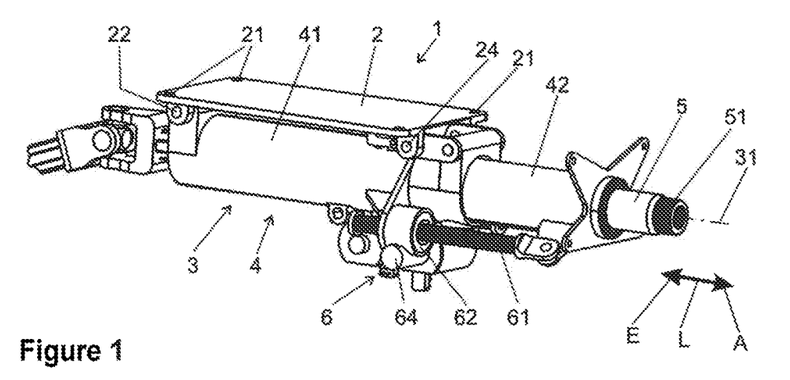
FIG. 1 is a perspective view of a steering column virtually fully extended in the longitudinal direction.
Figure 2:
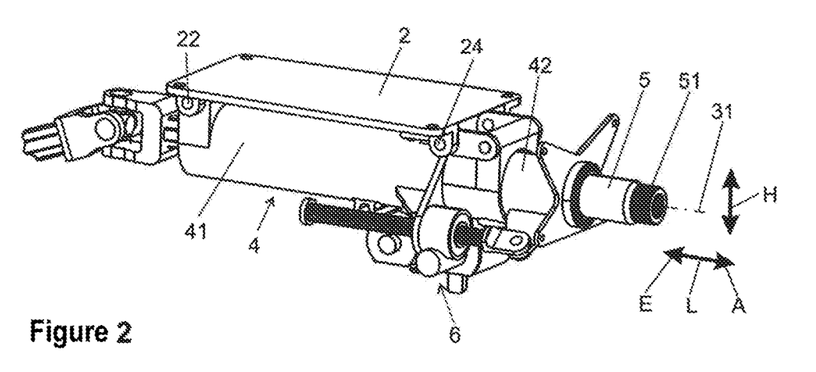
FIG. 2 is a perspective view of the steering column according to FIG. 1 in the telescoped state.
Figure 3:
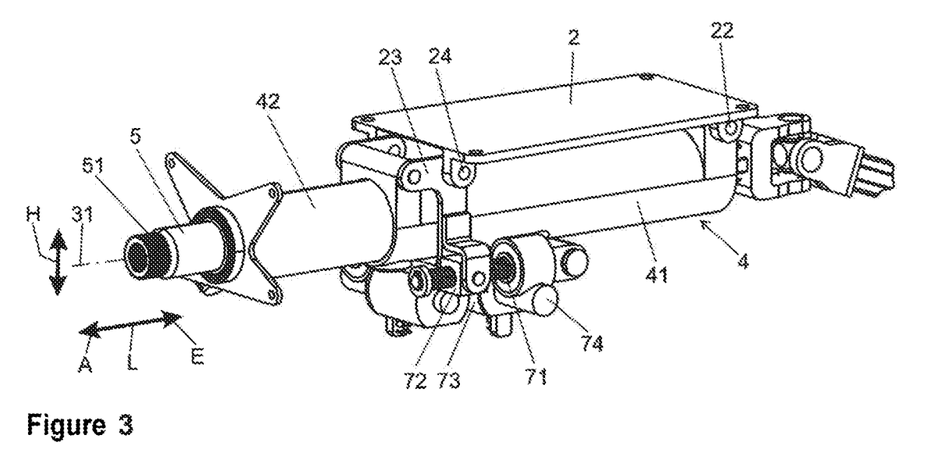
FIG. 3 is a perspective view of the steering column according to FIG. 1 from the opposite side.

FIGS. 1, 2 and 3 are schematic, perspective views of a steering column 1 according to the invention, obliquely from above and to the side onto the rear end, based on the direction of travel of a vehicle, not shown. FIG. 2 shows the fully retracted or pulled-in state corresponding to the stowage position in the longitudinal direction. FIGS. 1 and 3 show the extended or extracted state, corresponding to a longitudinal position within the comfort position range, from the left-hand side (FIG. 1) and from the right-hand side (FIG. 3). A longitudinal position within the comfort position range is hereinafter also designated a comfort position or comfort setting.

The steering column 1 comprises a supporting unit 2, which comprises fastening means 21 for connection with a motor vehicle body, not shown. The supporting unit 2 holds an actuating unit 3, which comprises a casing unit 4 in which a steering spindle 5 is mounted so as to be rotatable about a longitudinal axis 31 of the actuating unit 3. At the rear end, in relation to the direction of travel, the steering spindle 5 is provided with a fastening portion 51 for attaching a steering wheel, not shown here.

In the front end region thereof, the casing unit 4 is mounted on the supporting unit 2 so as to pivot about a horizontal pivot pin 22 extending transversely of the longitudinal axis 31. In the rear end region the casing unit 4 is connected with the supporting unit 2 via an actuating lever 23. Rotational motion of the actuating lever 23 about the pin 24 effects pivoting of the actuating unit 3 about the pivot pin 22, and thus leads to adjustment of the steering wheel in the vertical direction H, as indicated by the double-headed arrow.

In the embodiment shown, the casing unit 4 comprises an outer casing tube 41, and an inner casing tube 42. In the outer tubular casing 41, which is mounted on the supporting unit 2 so as to be non-displaceable relative to the longitudinal axis 31 in the longitudinal direction L, the inner tubular casing 42 is arranged coaxially and so as to retract and extend telescopically in the longitudinal direction L parallel to the longitudinal axis 31, as indicated by the double-headed arrow. In this case, extension or extraction proceeds rearwards in the extension direction A, and retraction or pulling in accordingly proceeds forwards in the opposite direction in retraction direction E. The extension direction A denotes the direction of movement parallel to the longitudinal axis 31 out of the stowage position towards a use position in the comfort position range; the retraction direction denotes displacement of the inner casing tube 42 in the opposite direction, i.e. towards the stowage position on stowage.

An electromotive actuating drive 6 is provided for longitudinal adjustment, i.e. for retraction and extension. This takes the form of a spindle drive and comprises a screw spindle 61, which extends parallel to the longitudinal axis 31 and is attached with its rear end non-rotatably to the inner tubular casing 42. A spindle nut 62 is screwed onto the screw spindle 61 and may be driven in rotation by an electrical servomotor 63 via a gear unit 64, which may take the form, for example, of a worm gear pair. Together with the gear unit 64, the spindle nut 62 is connected to the outer tubular casing 41 firmly, i.e. non-displaceably, relative to the longitudinal direction L, such that, depending on direction of rotation, rotation effects translational movement of the screw spindle 61 in the retraction direction E or in the extension direction A and thus retraction or extension of the inner tubular casing 42 relative to the outer tubular casing 41.

The coaxial arrangement of inner tubular casing 42 and outer tubular casing 41 is particularly clearly apparent from the longitudinally sectional representation in FIGS. 4, 5, 6 and 7. It is likewise apparent therefrom that the steering spindle 5 is likewise of telescopic construction, with an inner steering spindle 52 and an outer steering spindle 53, which are displaceable within one another in the longitudinal direction L and are connected form-fittingly with regard to rotation to transfer a steering moment.

The steering column 1 comprises a friction means 8. The friction means 8 comprises a pressure device 88 with a bearing block 81, which is firmly connected on the outside with the outer casing tube 41. A lever 82 is mounted on the bearing block 81 so as to pivot about a lever axis 83, which extends transversely of the longitudinal axis 31. The lever 82 takes the form of a double lever, comprising an operating element 84 on one lever arm and a friction element 85 on the other lever arm. The friction element 85 is arranged through an opening or orifice 44 in the outer casing tube 42 or guided radially inwards through this opening or orifice, such that it with a on a friction surface 851, which is formed on the side thereof facing the inner casing tube 42. The friction surface 851 may thereby be brought into sliding or frictional contact with a sliding surface 43 formed externally on the inner casing tube 42, as is clearly visible from the enlarged representation in FIG. 8.

Figure 8:
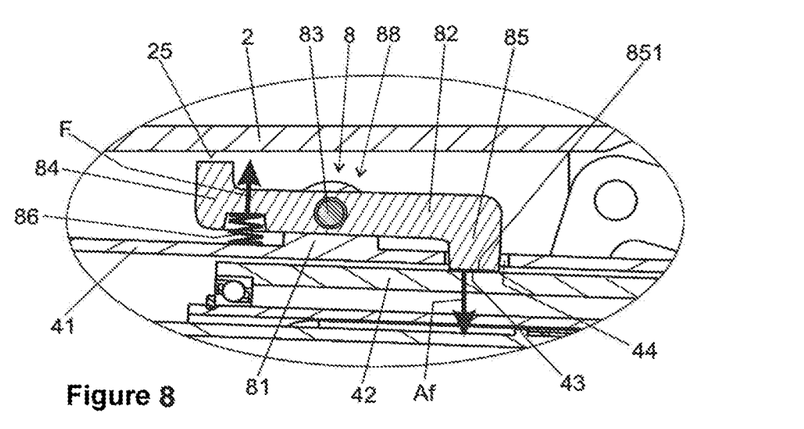
FIG. 8 is a detailed sectional view of FIG. 1 of a friction means in the friction position.

Between the lever arm bearing the operating element 84 and the outer casing tube 41, a spring 86 is used as a force-generating element, which spring takes the form of a compression spring and loads the operating element 84 resiliently radially outwards from the perspective of the casing tubes 41 and 42. Accordingly, the friction element 85 arranged on the other lever arm is pressed by the spring 86 with its friction surface 851 radially inwards against the sliding surface 43 of the inner casing tube 42.

The spring 86 exerts a radially outwardly directed spring force F on the lever 82, such that the friction surface 851 is pressed by the pressure device 88 with a contact pressure Af against the sliding surface 43, as is the case in the friction position illustrated in FIG. 8 and explained in greater detail further below.

Figure 4:
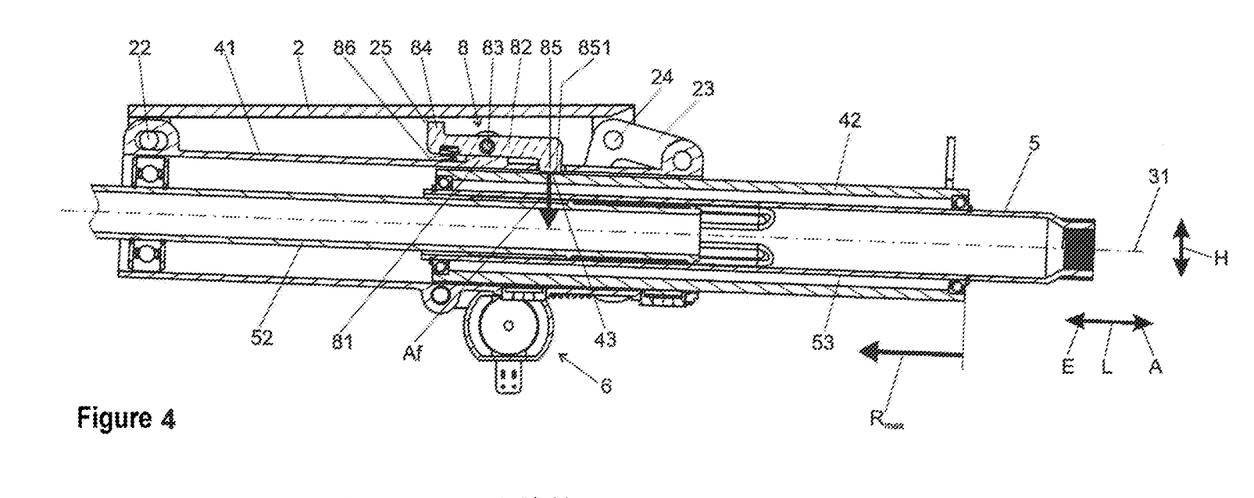
FIG. 4 is a longitudinal sectional view along the longitudinal axis through a steering column according to FIG. 1, in the friction position and fully extended in the longitudinal direction.

In the situation illustrated in FIG. 4, the actuating unit 3 is located in the use position or operating position within the comfort position range, in which the inner casing tube 42 has been extended maximally out of the outer casing tube 41 in the extension direction A. In this case, the friction surface 851 of the friction element 85 is pressed by the pressure device 88 of the friction means 8 with the contact pressure Af against the sliding surface 43, whereby the inner casing tube 42 is gripped or clamped in the outer casing tube 41, such that high actuating unit 3 rigidity is achieved. For longitudinal displacement of the inner casing tube 41 in the retraction direction E, the frictional force Rmax acting in the longitudinal direction between the inner casing tube 42 and the outer casing tube 41 has to be overcome by the actuating drive 6. For relatively slow adjustment for comfort positioning of the steering wheel relative to the driver's position, the actuating drive may be dimensioned as is known from known motor-adjustable steering columns.

If the actuating unit 3 is moved by means of the vertical actuating drive 7 into the uppermost height position, the operating element 84 comes into contact with a contact surface 25 formed on the supporting element 2, as shown in FIG. 4. Contact with the contact surface 25 marks a switchover position, which is outside the comfort position range and which is passed through during stowage in the vertical direction prior to or on reaching the vertical stowage position, which is conventionally located in the upper region of the maximum vertical adjustment height. In this case, the friction means 8 is switched over from the friction into the release position.

Figure 5:
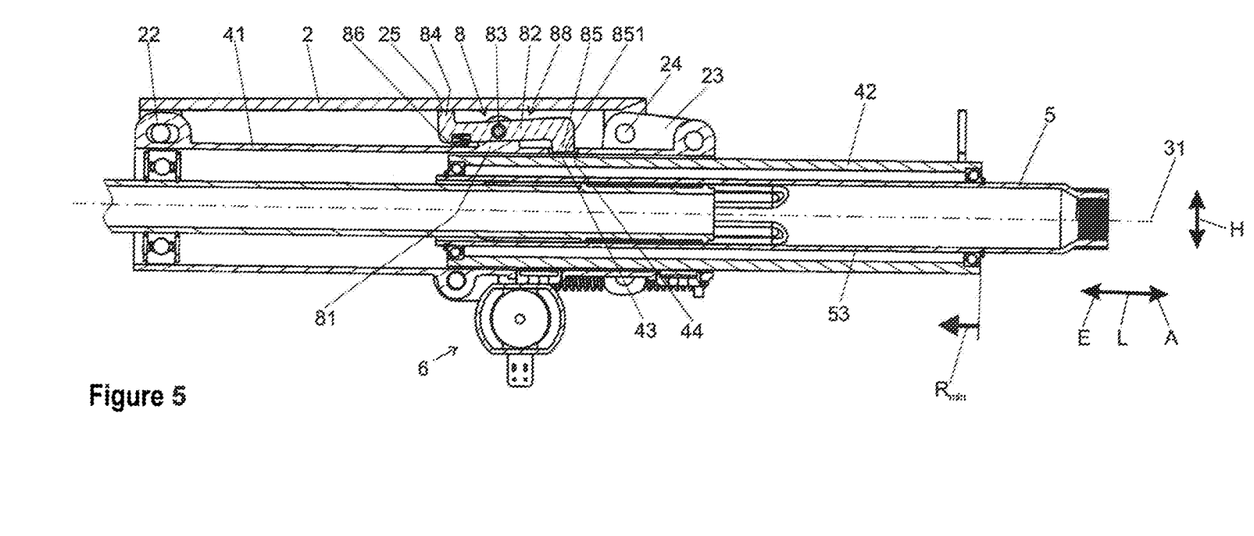
FIG. 5 is a longitudinal sectional view along the longitudinal axis through a steering column according to FIG. 1, in the release position and fully extended in the longitudinal direction.

On passing through the switchover position towards the end position in the vertical direction which corresponds to the stowage position in the vertical direction, the operating element 85 is operated in that it is moved contrary to the spring force F from outside relative to the outer casing tube 41, as indicated with the arrow in FIG. 5. The friction surface 851 is raised from the sliding surface 43 in that the play is increased between the friction surface 851 and the sliding surface 43 or at least is relieved to such an extent that the acting contact pressure Af is reduced. Adjustment of the casing tubes 41 and 42 is then counteracted only by a reduced frictional force Rmin, which is lower than the frictional force Rmax in the friction position. In this way, the inner casing tube 42 may now be retracted by the actuating drive 42 in the longitudinal direction L out of the comfort position range into the stowage position with higher adjustment acceleration and adjustment speed than in the friction position.

Figure 6:
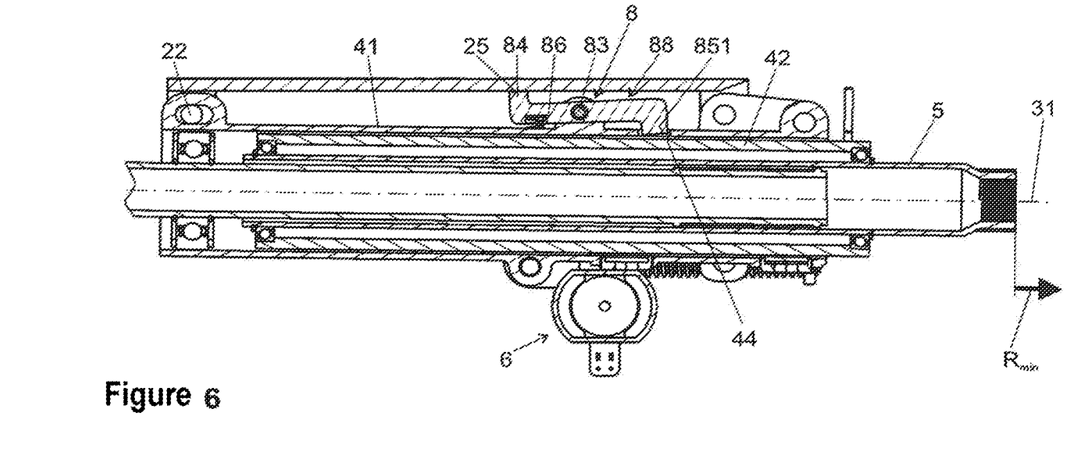
FIG. 6 is a longitudinal sectional view along the longitudinal axis through a steering column according to FIG. 1, in the release position and fully retracted in the longitudinal direction.

FIG. 6 shows the steering column 1 in the final stowage position, in which the inner casing tube 42 has been maximally retracted into the outer casing tube in the retraction direction E. In this stowage position the friction means 8 is in the release position. To move the inner casing tube 42 out of this stowage position into the comfort setting range, in the situation shown in FIG. 6 the inner casing tube 42 may be moved, with the friction means 8 in the release position, by the actuating drive 6 at high speed in the extension direction A out of the outer casing tube until the situation shown in FIG. 5 is reached.

Then the actuating unit 3 is moved by the actuating drive 7 downwards in the vertical direction H out of the stowage position, such that the operating element 84 is released from the contact surface 25 of the supporting unit 2 and consequently the friction means 8 is switched over into the friction position, wherein the friction element 75 presses with its friction surface 851 with the contact pressure Af against the sliding surface 43. The frictional force Rmax then takes effect, such that high actuating unit 3 rigidity is ensured.

Figure 7:
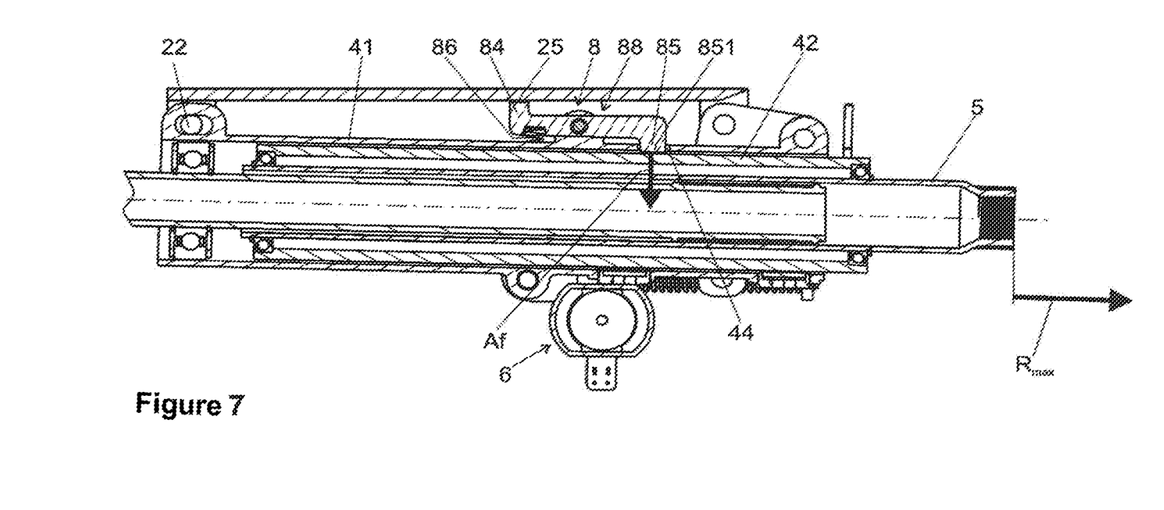
FIG. 7 is a longitudinal sectional view along the longitudinal axis through a steering column according to FIG. 1, in the switchover position and fully retracted in the longitudinal direction.

It is alternatively additionally possible to move the actuating unit 3 out of the stowage position shown in FIG. 6 downwards into the friction position, as shown in FIG. 7, by adjustment in the vertical direction. In this way, it may be ensured that the casing unit 4 also has high rigidity in the stowage position.

Figure 9:
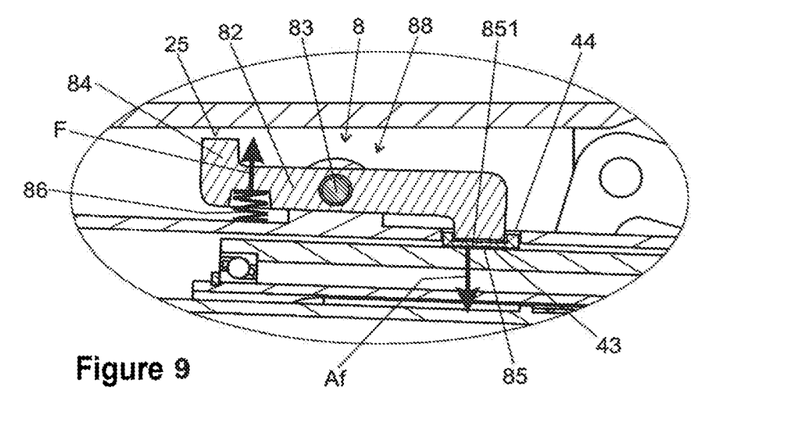
FIG. 9 is a detailed sectional view of a second embodiment of a friction means in a representation as in FIG. 8.
Figure 10:
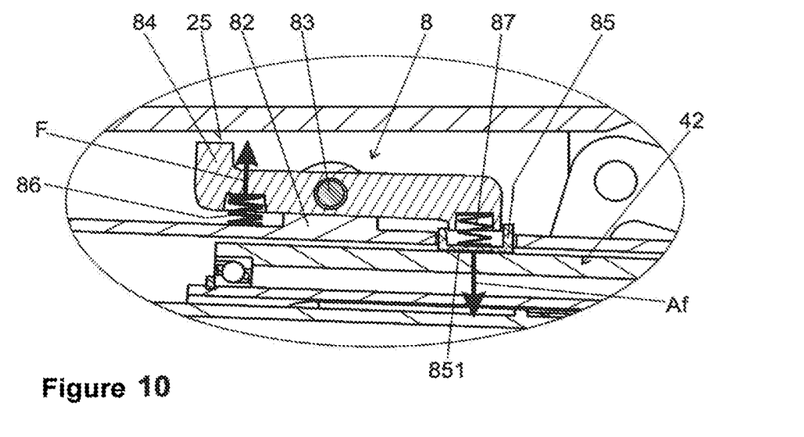
FIG. 10 is detailed sectional view of a third embodiment of a friction means in a representation as in FIG. 8.

FIGS. 9 and 10 show further configurations of the friction means 8. In the embodiment according to FIG. 9, the friction element 85 comprising the friction surface 851 takes the form of a separate component, fastened to the lever 82. To this end, the friction element 85 is roughly cap-shaped and attached to the end of the lever 82 facing the sliding surface 43, for example slipped form-fittingly thereon, as illustrated. It may also alternatively or additionally be bonded substance-to-substance, for example adhesively bonded, or fixed with fastening elements. Likewise conceivable and possible is partial encapsulation by injection molding of the lever 82 to form the friction element.

The material of the friction element 85 may preferably be adapted to the desired frictional behavior. While the lever 82 may for example consist of a material such as metal or plastics which is readily adaptable to the mechanical loads to be expected during operation, the friction element 85 may consist of a material with optimized sliding behavior, for example of a plastics material such as PTFE, or at least be coated with such a plastics material on the friction surface 851.

The embodiment of the friction means 8 shown in FIG. 10 likewise comprises a friction element 85 which is separately configured and attached to the lever 82, as in FIG. 8. In this case, a spring element 87 is inserted between the friction element 851 and the lever 82, which spring element 87 rests against the lever 82 and loads the friction element 851 resiliently relative to the sliding surface 43, specifically as shown in the friction position, but also ensures that it remains in contact with the sliding surface 43 in the release position. The contact pressure Af is transferred resiliently via the spring element 87, which is configured as illustrated as a compression spring. In this way, diameter tolerances of the inner casing tube 42 are compensated during comfort adjustment, so ensuring gentler and smoother adjustment. When the actuating unit 3 is brought into the stowage position, the operating element 84 strikes against the contact surface 25 of the supporting unit 2, and on further movement upwards in the vertical direction, as described, the arm directed towards the inner casing tube 42 is moved away from the sliding surface 43. In the process, the spring element 86 is gradually compressed and the contact pressure Af exerted on the friction surface 851 is constantly reduced, such that on switchover from the friction position into the release position the frictional force is reduced correspondingly gradually from Rmax to Rmin. In this way, an abrupt change is avoided, and the maximum and minimum values Rmax and Rmin may be predetermined by the characteristics of the spring element 87 to adapt sliding behavior and rigidity. In this way, possible play between inner casing tube 42 and outer casing tube 41 in the release position may be compensated, for example to prevent rattling noises.

What is claimed is:

1. A motor-adjustable steering column for a motor vehicle, comprising:
   a supporting unit which is configured to connect to a vehicle body;
   an actuating unit held by the supporting unit, the actuating unit comprising
      a steering spindle;
      a casing unit in which the steering spindle is mounted so as to be rotatable about a longitudinal axis, the casing unit comprising:
         an outer casing tube, in which an inner casing tube is accommodated so as to be axially displaceable telescopically in the direction of the longitudinal axis, and
         an actuating drive, which is connected with the inner casing tube and the outer casing tube and by which the inner casing tube is axially displaceable in and out relative to the outer casing tube, and
   a clamp arranged between the outer casing tube and the inner casing tube, the clamp configured to apply a frictional force between the outer casing tube and the inner casing tube with regard to relative displacement, which is adjustable between a release position and a friction position, wherein the frictional force is higher in the friction position than in the release position and wherein the frictional force is lower in the release position and in the friction position than an axial adjusting force which is exertable by the actuating drive between the outer casing tube and the inner casing tube.

2. The steering column of claim 1, wherein the axial adjusting force exerted by the actuating drive for adjustment between the outer casing tube and the inner casing tube is the same in the release position and in the friction position.

3. The steering column of claim 1, including a pivot pin extending transversely of the longitudinal axis and wherein the actuating unit is mounted on the supporting unit so as to be vertically pivotable about the pivot pin.

4. The steering column of claim 3, including an electrical vertical actuating drive connected to the supporting unit and the actuating unit, by which the actuating unit may be moved relative to the supporting unit about the pivot pin.

5. The steering column of claim 1, wherein the clamp is attached to the outer casing tube.

6. The steering column of claim 1, wherein the clamp comprises a pressure device and at least one friction element with a friction surface, wherein, in the friction position, the pressure device presses the friction surface with a predetermined contact pressure against a sliding surface on the inner casing tube.

7. The steering column of claim 6, wherein a spring element is arranged between the pressure device and the friction element.

8. The steering column of claim 6, wherein the friction element is arranged in a hole delimited in the longitudinal direction in the outer casing tube.

9. The steering column of claim 6, wherein the pressure device comprises a pressure element, which rests against the outer casing tube or against the supporting unit.

10. The steering column of claim 6, wherein the pressure device comprises an operating element which may be activated to set the release position, wherein the friction surface is released from the sliding surface on the inner casing tube or at least the contact pressure is reduced relative to the friction position.

11. The steering column of claim 10, wherein the operating element is permitted, by pivoting the actuating unit about the pivot pin, to be brought into active engagement with the supporting unit to set the release position.

12. The steering column of claim 10, wherein the pressure device comprises a lever mounted pivotably on the outer casing tube, which lever comprises the operating element and a friction element.

13. The steering column of claim 1, wherein an energy-absorbing means is arranged between the supporting unit and the actuating unit or the outer casing tube and the inner casing tube.

14. A method for adjusting the steering column of claim 1, wherein on adjustment of the actuating unit by means of an actuating drive,
   during adjustment into a steering column operating position within a comfort setting range, the clamp is moved into the friction position, and
   during stowing of the steering column into a stowage position the clamp is moved into the release position outside the comfort setting range,
   wherein in the friction position, the frictional force between the outer casing tube and the inner casing tube are greater than in the release position.

15. The method of claim 14, wherein the clamp is brought into the release position on reaching a switching position by pivoting the actuating unit towards the stowage position.

* * * * *